United States Patent [19]
Schumacher et al.

[11] Patent Number: 5,984,415
[45] Date of Patent: Nov. 16, 1999

[54] PASSENGER SERVICE UNIT ESPECIALLY FOR A PASSENGER AIRCRAFT CABIN

[75] Inventors: Markus Schumacher; Andrew Muin, both of Buxtehude, Germany

[73] Assignee: DaimlerChrysler Aerospace Airbus GmbH, Hamburg, Germany

[21] Appl. No.: 08/714,781

[22] Filed: Sep. 16, 1996

[30] Foreign Application Priority Data

Sep. 14, 1995 [DE] Germany ............... 195 34 025

[51] Int. Cl.[6] ............... A47C 7/54; A47C 7/62; A47C 1/12
[52] U.S. Cl. .............. 297/411.2; 297/411.45; 297/217.3; 244/118.5; 244/122 R
[58] Field of Search ............. 397/411.2, 411.45, 397/411.38, 188.14, 188.15, 188.16, 217.3; 244/118.5, 118.6, 122 R

[56] References Cited

U.S. PATENT DOCUMENTS

| | | | |
|---|---|---|---|
| 2,251,544 | 8/1941 | Jiranek | 297/188.15 |
| 3,489,458 | 1/1970 | Karlsen | 297/411.45 |
| 4,094,256 | 6/1978 | Holper et al. | 108/50.02 |
| 4,190,284 | 2/1980 | Schmidhuber et al. | 297/188.16 |
| 4,509,097 | 4/1985 | Robinson | 297/188.14 |
| 4,774,514 | 9/1988 | Hildebrandt et al. | |
| 4,828,323 | 5/1989 | Brodersen et al. | 297/411.38 |
| 4,907,835 | 3/1990 | Salters | 297/411.21 |
| 4,982,996 | 1/1991 | Vottero-Fin et al. | 297/217.3 |
| 5,318,340 | 6/1994 | Henry | 297/217.3 |
| 5,368,359 | 11/1994 | Eakin | 297/217.4 |

FOREIGN PATENT DOCUMENTS

| | | |
|---|---|---|
| 3444802 | 6/1986 | Germany. |
| 3719105 | 12/1988 | Germany. |
| 4227377 | 2/1993 | Germany. |
| 4301681 | 10/1994 | Germany. |

*Primary Examiner*—Anthony D. Barfield
*Attorney, Agent, or Firm*—W. F. Fasse; W. G. Fasse

[57] ABSTRACT

In a passenger service unit, particularly in a passenger cabin of an aircraft, comfort and service elements such as a reading lamp, a flight attendant call button, a loudspeaker, an air nozzle, an oxygen mask and generator, optical display elements, are integrated into a service column. Feeder lines between a main supply line and the passenger service columns are flexible to facilitate the mounting or placement of the columns as a complement to a passenger seat. The column is positioned in the lateral area of a seat to which the column is allocated.

11 Claims, 7 Drawing Sheets

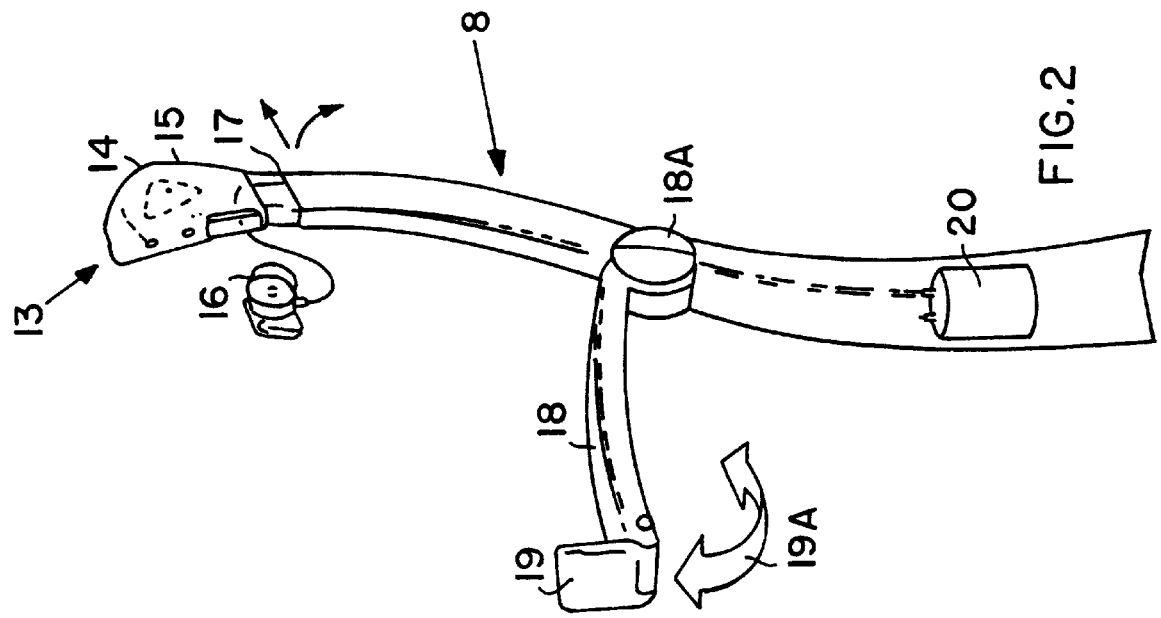
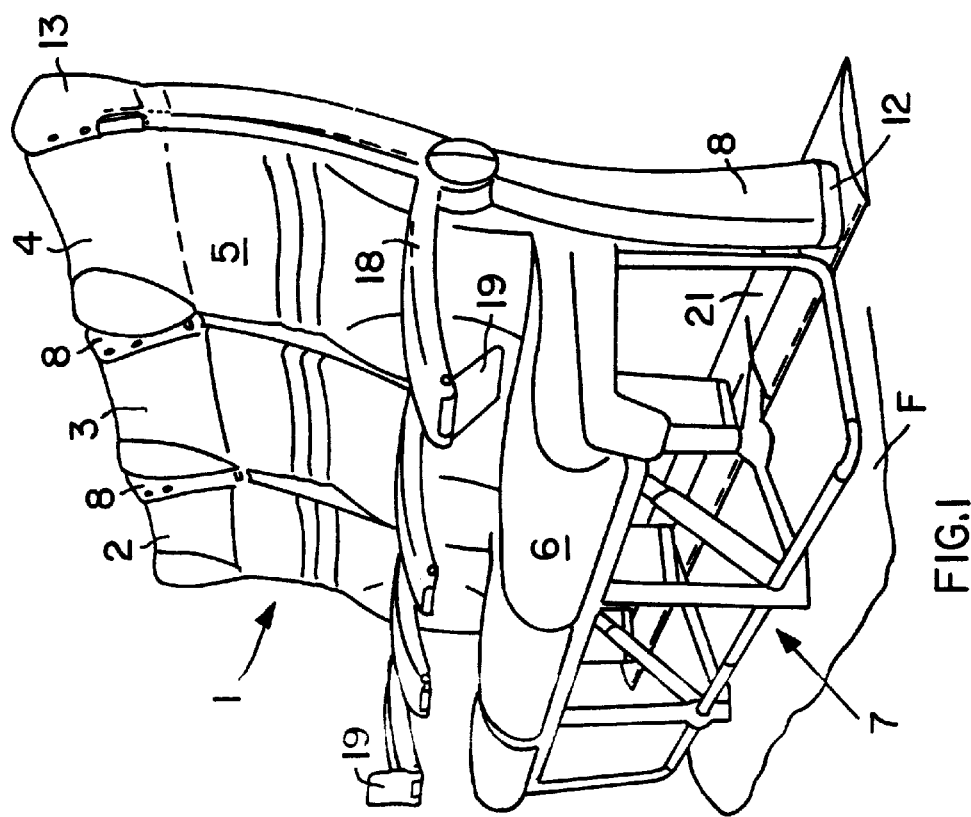

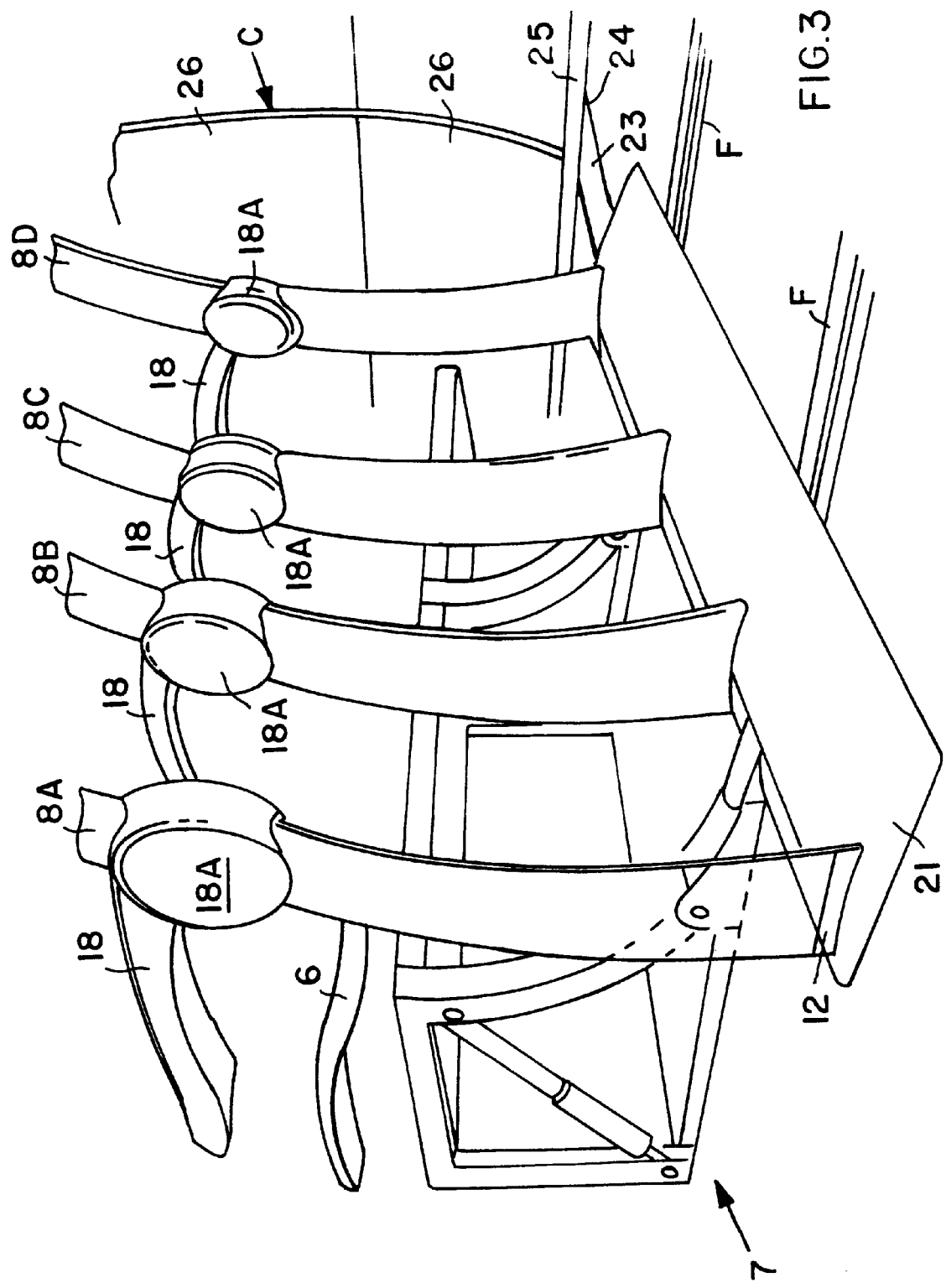

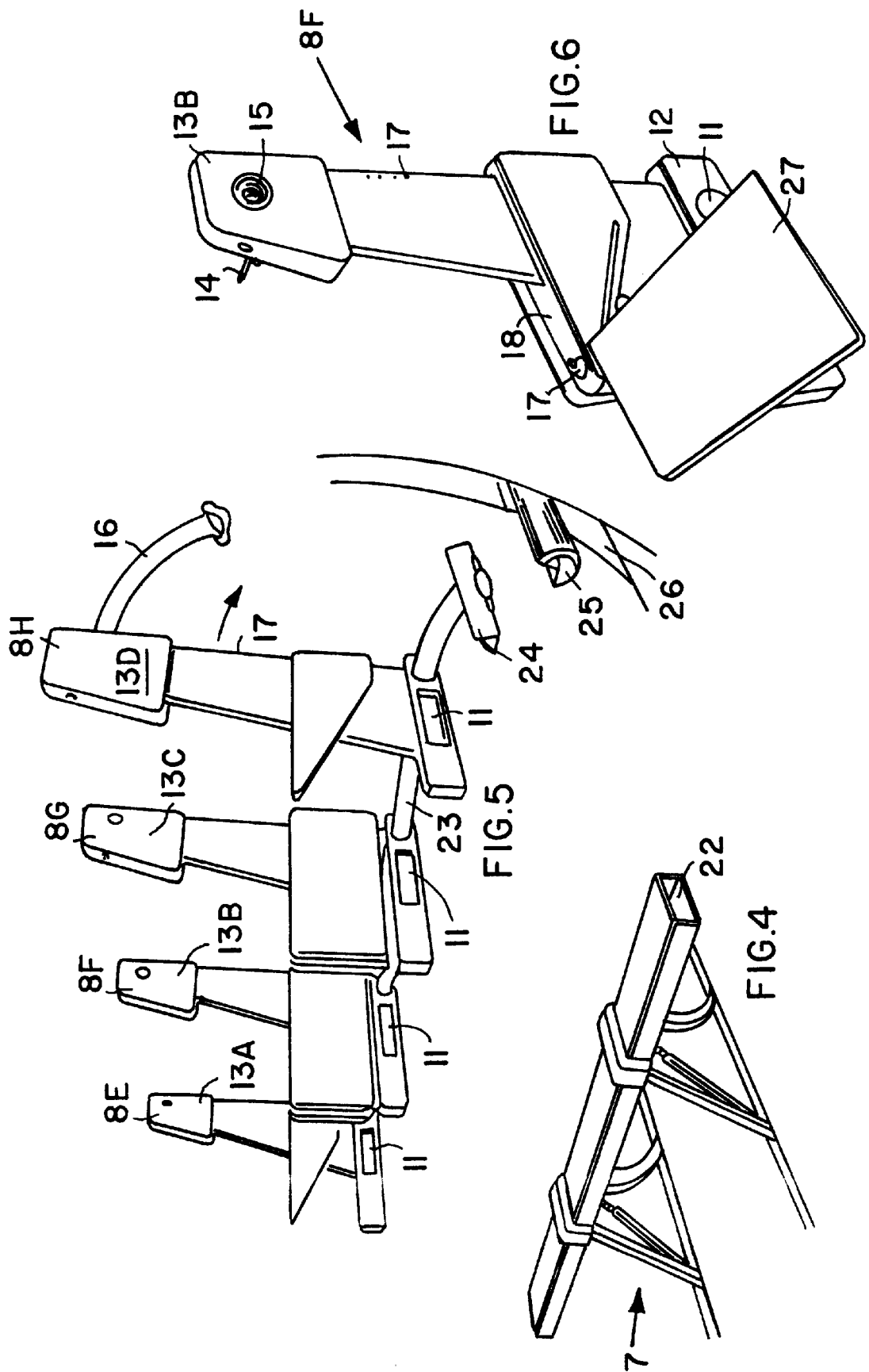

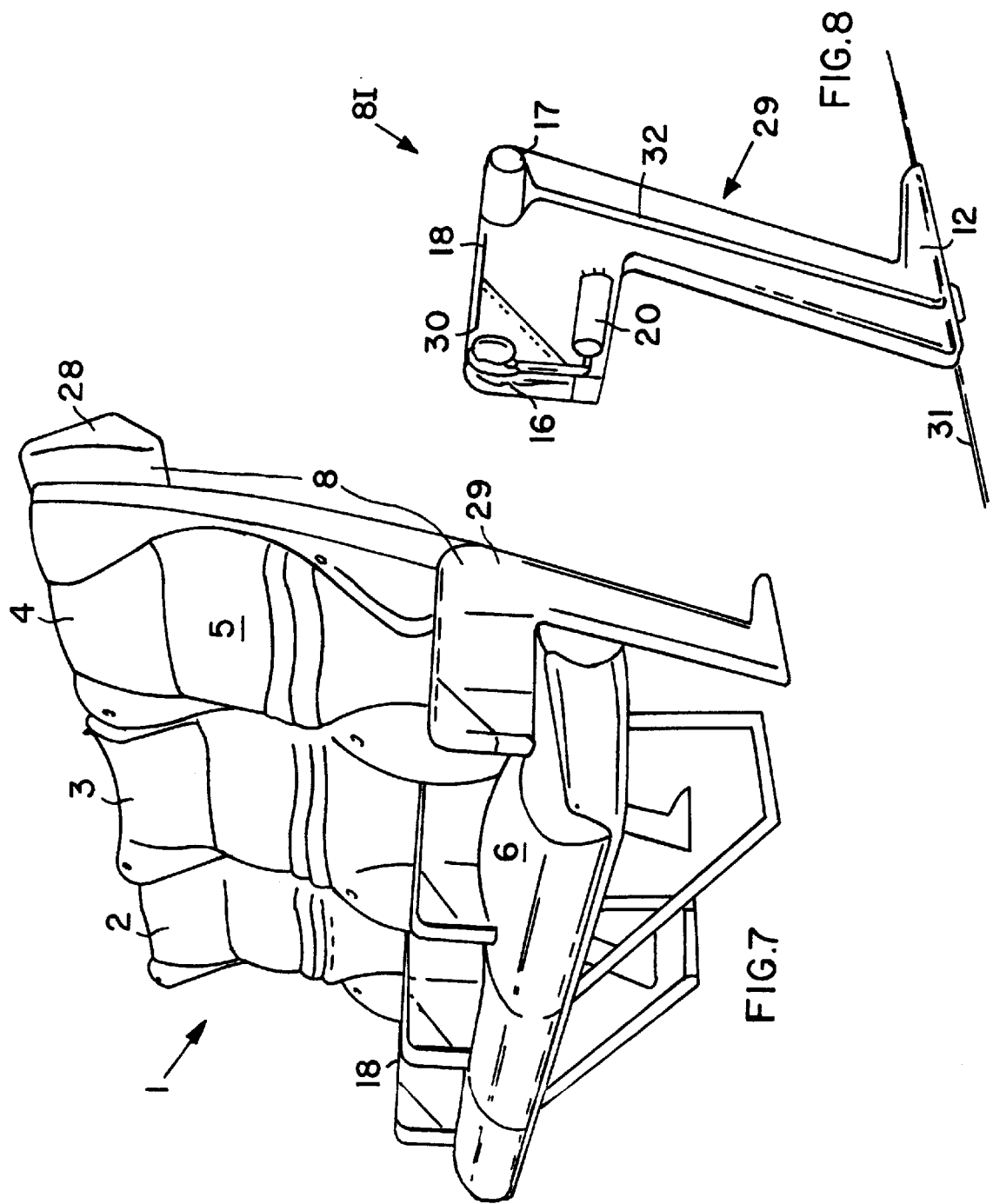

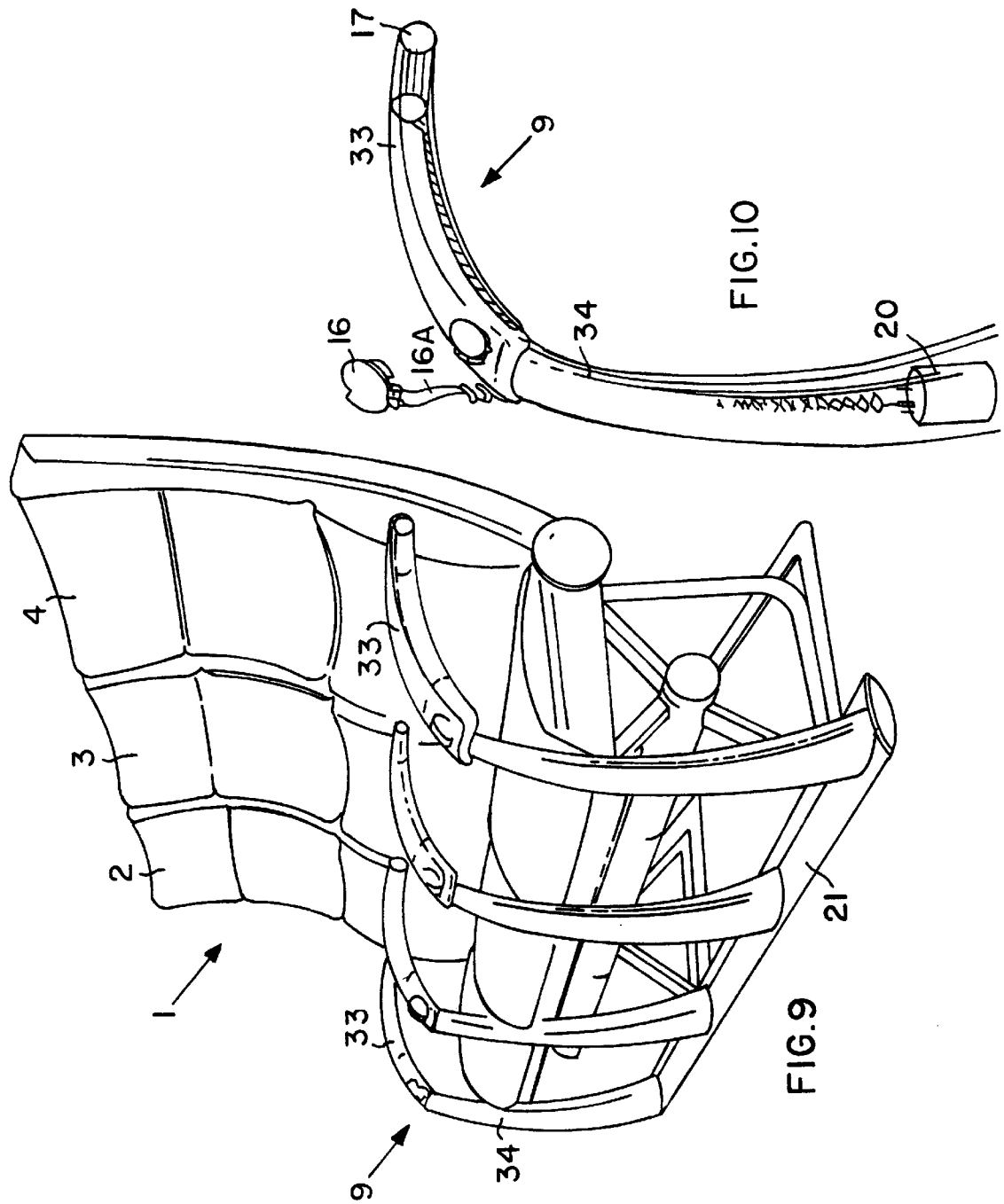

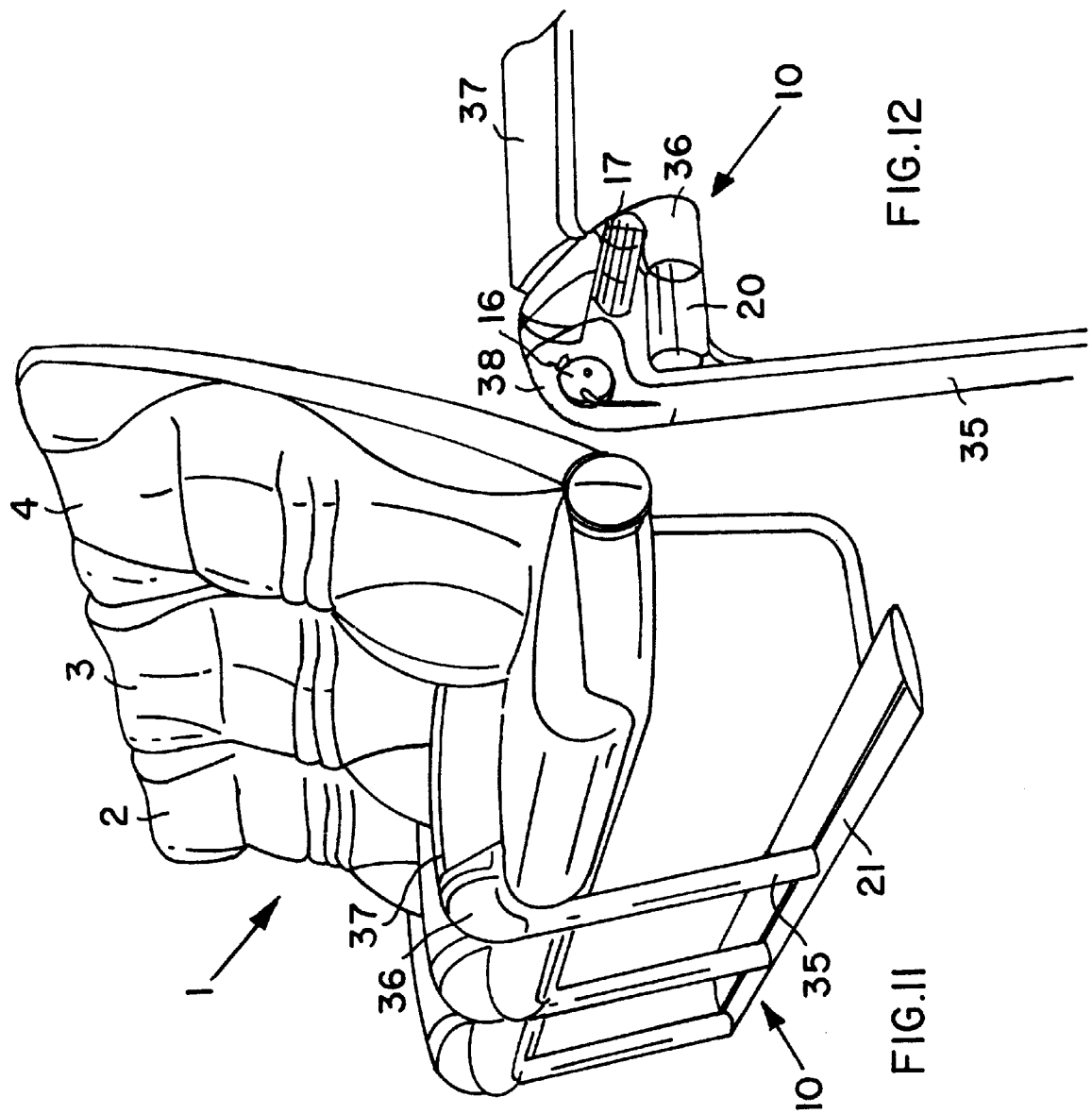

PASSENGER SERVICE UNIT ESPECIALLY FOR A PASSENGER AIRCRAFT CABIN

CROSS-REFERENCE TO RELATED APPLICATIONS

The present application relates to our copending, commonly assigned application U.S. Ser. No. 08/714,204, filed simultaneously herewith, (our Docket No.: 3331).

FIELD OF THE INVENTION

The invention relates to a passenger service unit, particularly in a passenger cabin of an aircraft. Such a passenger service unit contains passenger comfort and service elements, such as a reading lamp, a flight attendant call button, a loudspeaker, an air nozzle, an oxygen mask and generator, optical display elements, and feed lines between a main supply line and the service unit.

BACKGROUND INFORMATION

German Patent Publication DE 43 01 681 C1 (Schumacher), published on Oct. 20, 1994, and corresponding to U.S. Pat. No. 5,556,332, describes such service units, called passenger service units (PSU), in a passenger aircraft cabin. The PSUs are provided for each row of seats and are mounted beneath the luggage compartments arranged in the upper area of the cabin. Increasingly, such luggage compartments are being fitted with a flap or shell that can be lowered. Such lowerable flaps, however, do not allow a service unit to be positioned in the middle area of the row of seats because the service unit would interfere with the luggage compartment flap when the flap is lowered. Consequently, the service units are conventionally displaced away from the middle area toward the windows, where they are not readily accessible to the passengers sitting in the aisle seats, whereby a conflict area is formed between passengers in window seats and center seats and passengers in aisle seats who have a harder time reaching the service units, whereby the latter can annoy the former when trying to access the service units.

Further, it is important for the passengers to have a sense of comfort and well-being based on a cabin that presents a spacious appearance to avoid a closed-in feeling. The arrangement of the service units in the upper area of the cabin, as described in the above mentioned publication, detracts from the positive impression of a spacious cabin. The free and clear head room is limited by the space needed by each passenger to access the service unit. As a result, the inner contour of the cabin is correspondingly low at this location. Furthermore, the service units also require repositioning when the seating layout is changed. This results in substantial additional time and effort for assembly and maintenance of the seating arrangement.

It is also known that certain elements for passenger comfort and service can be arranged in the passenger seats. For example, German Patent Publication DE 37 19 105 A1 (Keiper), published on Dec. 22, 1988, shows a flight passenger seat, in which communication elements such as receivers, loudspeakers, video connections, control elements, and reading lamps are integrated. The communication and control elements are part of a wireless radio information system powered by an energy source that is allocated to the specific seat.

DE 42 27 377 A1 (Beroth), published on Feb. 25, 1993 discloses a further passenger seat which contains an emergency oxygen system. An oxygen generator is integrated into the seat section while a mask compartment is provided in the backrest. This publication, however, does not show how additional components for supplying passenger services are arranged.

In German Patent Publication DE 34 44 802 C2 (Sprenger et al.), published on Jun. 12, 1986; corresponds partly to U.S. Pat. No. 4,774,514 (Hildebrandt), it is suggested that data terminals be arranged at the passenger seat, particularly in the rear side of the backrests of the seats, for providing the passengers with service, monitoring, entertainment, information, and management to functions. According to this publication, the passenger can use these terminals to gather certain information, perform certain work, or for entertainment. The above mentioned publication discloses nothing about the arrangement of other systems that are relevant to passengers, such as flight attendant call, on-board speaker system, reading lamps and air nozzles.

The above conventional, prior art thus shows that single components or single systems that function for the most part independently of a total supply or service system, can be integrated into a seat and thus become a structural part of the seat. However, a functional consolidation of all components that are available to the passenger, in the form of one service unit, separate from the passenger seat, and that are fed from one main supply line, is not known.

OBJECTS OF THE INVENTION

In view of the above it is the aim of the invention to achieve the following objects singly or in combination:

- to arrange a passenger service unit in a simple manner within the passenger cabin and to construct such a unit so that all passenger service functions are encompassed in one unit that is comfortably accessible within the reach of a seated passenger;
- to avoid integrating service and comfort elements or components into a flight passenger seat in order to achieve a separation of the systems that are specific to the aircraft from those that are specific to flight passenger seats;
- to avoid placing or arranging these service and comfort components in positions in the overhead area that would disturb other passengers; and
- to place these PSUs as close as possible to each seat without interfering with the functions of the respective seat.

SUMMARY OF THE INVENTION

The above objects have been achieved by a passenger service unit constructed as a column and arranged as a seat complementing component close to each passenger seat, preferably along one side of the respective seat to which the column is allocated without being integrated into the seat. By "seat complementing component" is meant a separate service component independent of the seat but fully capable of cooperating with the respective passenger seat for the passenger's comfort.

It is a particular advantage of the invention that a passenger sitting in a seat can access the service functions comfortably, without disturbing any neighbor. By eliminating passenger service functions from the overhead area beneath the luggage compartments, a more generous impression of space in the passenger cabin is achieved which contributes to a positive effect on the comfort and sense of well-being of the passengers. Furthermore, allocation of the arrangement of all passenger service and comfort functions to the immediate vicinity of the passenger seats reduces the time and effort involved in adapting the passenger service units to a changed seating layout. This is a significant improvement in the flexibility of the layout or seating arrangement e.g. when changing from business class layout to tourist class layout or vice versa.

By consolidating all the single components into one service unit, separate mountings for the comfort and service elements are dispensed with, thus reducing the time and effort expended in the assembly and maintenance. The present functional arrangement of the passenger service elements is clear and organized in an orderly manner thereby facilitating the operation of the service and comfort functions for the passenger while simultaneously permitting maintenance operations independently of the seat.

In a further preferred embodiment portions of the column simultaneously serve as a functional component of the seat without becoming part of the seat.

A further embodiment wherein the PSU column has a head section which shields the passenger toward the neighboring seat. Yet, it is possible to arrange passenger comfort elements, for example light sources, on or in the head section whereby the light source service more than one seat.

The present PSU columns are very versatile in their ability to be mounted in various positions relative to the seat served by the respective column.

Additional service functions provided in a rearwardly facing portion of a PSU are readily accessible and within the immediate reach of a passenger seated in a seat directly behind the column.

The present columns provide an advantageous possibility to connect a passenger service unit to a central or main supply line since the columns are mounted to the floor and a main supply line is more conveniently installed in or near the cabin floor than in an overhead area reserved for a luggage compartment.

BRIEF DESCRIPTION OF THE DRAWINGS

In order that the invention may be clearly understood, it will now be described, by way of example, with reference to the accompanying drawings, wherein:

FIG. 1 shows a perspective view of a group of seats with passenger service units embodied as columns provided for each seat without becoming integrated with the respective seat;

FIG. 2 shows a column according to FIG. 1 in detail;

FIG. 3 shows a partial rear view of a group of PSU columns mounted on the cabin floor directly behind a seating group support base;

FIG. 4 shows a support base or frame having an adapter capability for the PSU columns of a seating group;

FIG. 5 shows a second embodiment of the present PSU column with one form of an armrest in an arrangement with a seating group;

FIG. 6 shows in detail one column of the embodiment of FIG. 5;

FIG. 7 shows a third embodiment of the present PSU column with a Z-configuration in a group of three seats;

FIG. 8 shows in detail one column of the embodiment of FIG. 7;

FIG. 9 shows a fourth embodiment of the present PSU column with a bow configuration column in a group of three seats;

FIG. 10 shows in detail one column of the embodiment of FIG. 9;

FIG. 11 shows a fifth embodiment of the present PSU column with a column head;

FIG. 12 shows in detail one column of the embodiment of FIG. 11; and

Figure 13:
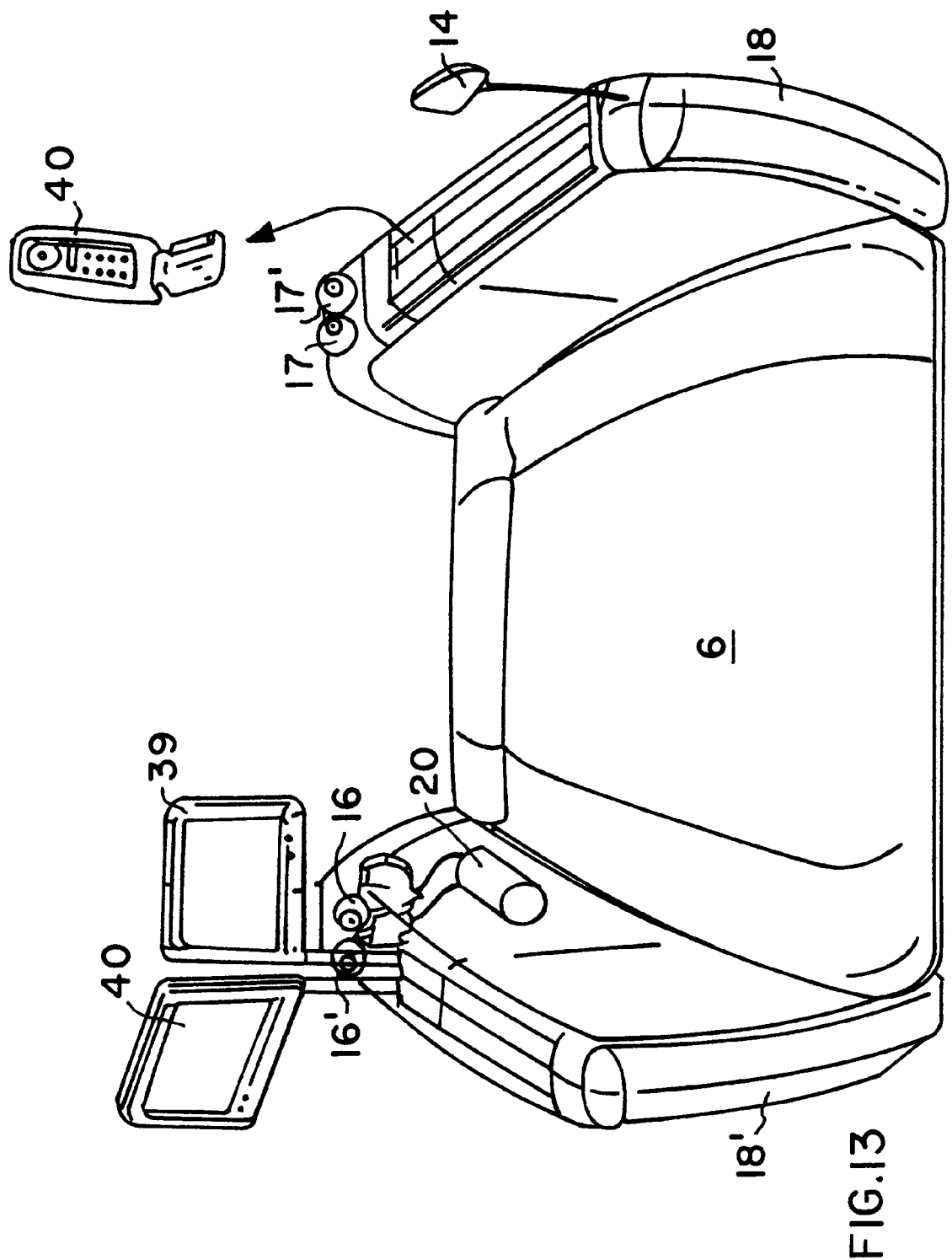
FIG. 13 shows a rear view of a seat without the backrest, to illustrate the present PSU column formed as armrests.

DETAILED DESCRIPTION OF PREFERRED EXAMPLE EMBODIMENTS AND OF THE BEST MODE OF THE INVENTION

FIG. 1 shows a seating group 1 comprising several seats 2, 3, 4 s each including a backrest 5 and a seat section 6. The seats 2, 3, 4 are rigidly secured in a row to a support frame or base 7 which is attached to a cabin floor F of an aircraft passenger cabin C shown in FIG. 3. A service unit according to the invention that contains all essential passenger comfort and service elements or components is directly allocated to each seat 2, 3, 4 but is entirely independent of the respective seat even if the present service unit complements the respective seat. Thus, a seated passenger can comfortably access the passenger comfort and service elements without disturbing any neighbor.

FIGS. 1 and 2 show an embodiment of the passenger service unit as a modular housing column 8, simply referred to herein as column one of which is arranged next to each seat of a group to the side of each seat 4 in the area of the backrest. The curved form of the column is adapted to or conforms with the lateral seat contour and is fixed to the floor structure F. In the shown arrangement of the columns 8 each service and comfort component of each column is supplied through feeder lines that are arranged inside a floor plate 21.

FIGS. 1 and 2 show that the column 8 extends from the floor to the head area of the passenger seat and is constructed in the head area as a head section 13. This head section 13 functions as a sight shield or blind to the neighboring seat. The head section 13 at the top of column 8, contains essential passenger comfort and service elements such as a reading lamp 14, a loudspeaker 15, or headphone jacks and an oxygen mask 16. Furthermore, a service element such as a lamp, can be provided that serves more than one seat at a time. Preferably, the head section 13 is tiltable or rotatable whereby the comfort of the passenger is increased since the position of the corresponding service elements can thereby be adjusted to the needs of the passenger.

As further shown in FIGS. 1 and 2, the slender column 8 has a concave upper portion that preferably conforms to the shape of the backrest, and a convex lower portion mounted to cabin floor F. Both, the convex portion and the concave portion face a viewer who faces toward the tail end of the aircraft opposite to the viewing direction of a passenger sitting on a seat 6. Preferably, the upper concave column portion merges into the lower convex column portion where an armrest 18 is mounted to the column housing.

Air nozzles 17 may be arranged on the rear-facing side of the column and thus offer additional climate control for providing a comfortable and pleasant climate for the passenger seated to the rear of the respective column. A portion of any of the present columns is preferably embodied as an armrest 18. Thus, certain passenger service functions can also be arranged in the area of the armrest that forms part of or is attached to the column 8. In the embodiment shown in FIGS. 1 and 2, a control panel 19, preferably provided with optical display elements is secured, for example hinged to the armrest 18. This control panel 19 can be brought up into its working position shown in FIG. 2 only when it is needed.

Otherwise the panel 19 remains folded down under the armrest as indicated by the arrow 19A. An oxygen generator 20 is arranged inside the column 8. FIG. 2 further shows that the armrest 18 is secured to the column 8 by a mounting 18A approximately midway between the ends of the column 8.

FIG. 3 shows a partial rear view of a group of seats in the area of the support frame 7. Only one seat section is shown. The above mentioned floor plate 21 is preferably hollow and forms a connecting element between the passenger service columns 8A to 8D of a group of seats 1. The floor plate 21 also serves as a housing or cross conduit for the feeder lines 23 that are adapted for connection to a main supply line 25 through a connection 24 (shown in FIG. 5). The main supply line 25 contains the necessary power supply, information supply, air supply, etc. in separate lines for all the passenger comfort and service elements contained in the columns 8A to 8D connected by individual air feeder lines 23 for feeding fresh air to the air nozzles 17. Electrical power lines for the reading lamp 14 and signal transmission lines for the optical display elements in the control panel 19, etc. are also provided in the feeder lines 23. The main supply line 25 is preferably arranged in the floor area at the outer wall of the cabin C behind cabin wall panels 26.

FIG. 4 shows a supporting frame 7 provided with a hollow crossbeam 22 serving as a mounting for the columns 8, as a channel for the feeder lines 23, and simultaneously as a support for the passenger seats 2, 3, 4.

The columns 8E to 8H shown in FIG. 5 relate to a second embodiment. Each column is provided with an opening 11 through the lower column area. The columns can be mounted on the crossbeam 22 which passes through these openings 11 and thus are supported directly on the supporting frame 7. The feeder lines 23 may be enclosed in a flexible tube for connecting the passenger comfort and service elements in the columns 8E to 8H of a group of seats, through a flexible supply line adapter 24 to the main supply line 25 which is preferably arranged in the floor area at the cabin outer wall behind cabin wall panel elements 26.

FIG. 6 shows a single column 8F according to the second embodiment that is connected by a connector tube forming a feeder line 23, seen in FIG. 5, to the other columns 8E, 8G, and 8H. In this embodiment, the column 8F is constructed as a flat pillar configuration or support post 8F that serves simultaneously as a divider element to shield a passenger from the neighboring seat. The pillar is wider at its lower end which is provided with a column foot 12. The narrower upper end of the column or 8F pillar is enlarged by a head element 13B in the head area of the passengers. Important service functions can be provided in the head element 13B, such as the reading lamp 14 and the loudspeaker 15. An oxygen mask 16, an oxygen generator 20, and an air nozzle 17 are arranged on the rear-facing portion of the columns 8E to 8F and provide services for a passenger seat positioned to the rear and directly behind the respective column. In addition to the previously mentioned service functions, column 8F contains a table 27 with communication and control elements. A table is arranged on the armrest 18 and is brought into a use position only when needed. The armrest 18 is secured to the pillar 8F between the lower and upper ends of the pillar 8F.

FIGS. 7 and 8 show a third embodiment of the column 8I having a Z-configuration. Here, the column 8I is divided into two parts, an upper column portion 28 seen in FIG. 7 and a lower column portion 29 seen in FIGS. 7 and 8. The upper column portion 28 is arranged next to the respective rear-facing wall of the backrest 5 of a seat 2, 3, or 4 in the area of the head rest and is thus positioned, with its service and comfort elements, in the optimal control and access area of a passenger seated in a seat arranged to the rear of the respective column. As best seen in FIG. 8, the lower column portion 29 has three sections forming the Z-configuration, wherein an upper Z-part forms the armrest 18, and a lower Z-part forms a column foot 12 connected to the cabin floor. The upper Z-part and the lower Z-part are interconnected by a slanted Z-part.

As shown in FIG. 8, the oxygen generator 20 plus the oxygen mask 16 and its covering 30 are situated in the upper Z-part of the column that is embodied as an armrest 18. The air nozzle 17 for the rear passenger seat is also arranged in the rear-facing area of the lower column portion 29. In this embodiment, the air is fed to the nozzle through a supply line track 31 that supplies air into the area of the seat rails which is then fed to the air nozzle 17 by a tap line 32. In the arrangement shown, a connection to a central or main supply line 25 can also run along the area beneath the cabin floor F near the seat rails of the group of seats to be supplied.

FIGS. 9 and 10 show a fourth embodiment of the present passenger service unit as a column 9, one of which is provided for each seat 2, 3, 4 in the group 1, whereby FIG. 10 shows column 9 in more detail. Column 9 configuration is a curved or bow shaped column. The upper portion of the column forms an armrest 33 mounted to a lower portion forming a support column 34. Thus, an armrest as part of the side of a seat is eliminated. The support column 34 is attached to the floor structure at the frontal area of the respective seat. The foot of each column is secured to the floor through a hollow floor plate 21 which contains the feeder lines that feed the passenger comfort and service elements as described. The oxygen generator 20 is integrated into the support column 34 and is connected by a flow duct 16A to the oxygen mask 16. The oxygen mask 16 is integrated in the area of the handrest in the armrest 33. On demand, the mask is automatically ejected or discharged into the immediate vicinity and reach of the passenger. An air nozzle 17 is arranged at the end of the column in the armrest 33 in the area facing the backrest of the seat.

FIGS. 11 and 12 show a fifth embodiment of the present column 10. In this embodiment, the column 10 is constructed as a half-column one of which is provided for each seat as shown in FIG. 11 in an arrangement within the group of seats 1. In this embodiment the half-column 10 has a nearly vertically erect support 35 that ends at the height of the respective seat section. A housing head 36 is mounted to the upper end of the support 35. The half-column 10 is secured to the floor through the hollow floor plate 21 which contains the feeder lines as described. The service and comfort elements are arranged in the housing 36 which is shaped to end directly in front of and is matched to the front end of an armrest 37 of the respective seat. Thus, the elements in the housing 36 are presented in the area of direct reach of a passenger.

FIG. 12 shows how the head 36 of the half-column 10 forms a housing for the comfort and service elements. The head 36 is integrated with the support 35. The oxygen mask 16 is positioned in the corner area 38 of the housing 36. The oxygen generator 20 is positioned in the lower area of the housing 36. The air nozzle 17 is located in that portion of the housing or head 36 which faces the seat and thus the passenger. As seen especially in FIG. 12, the housing head 36 has a bulbous configuration which forms a front end of the armrest 37 and a transition into the armrest 37 of a respective seat.

FIG. 13 shows a rear view of a seat section 6 with the backrest removed to avoid obscuring the service and comfort elements. In this embodiment the columns are formed as armrests 18, 18' rigidly secured to the seat support cross structure not shown in detail.

Nevertheless, the armrests 18,18' are independent of the seat section 6. The passenger service elements in the armrests 18, 18' are conveniently positioned within the view area of a seated passenger. A rotatable LCD display 39 that can be folded into the armrest 18' is arranged on one side of the seat section 6. Also arranged in this armrest 18' are the oxygen mask 16 and an additional oxygen mask 16 for persons that may happen to be in the aisle. The armrest column 18, with the air nozzles 17, 17', a control panel 40, and a telescopable lamp 14 are arranged on the other side of the seat section 6.

It is a common feature of the described embodiments according to FIGS. 1 to 13 that the service and comfort elements of a passenger service unit are arranged in one service component formed as a housing for the service and comfort elements. The housing has the form of a column including a curved column that is allocated to a passenger seat 2, 3, 4 in the passenger seating area. This service component will move with the respective seat if the seating layout within a passenger cabin is changed, without interrupting the service functions and without having to reconnect the various individual services. Flexible supply line connectors or adapters 24 enable the service units to be quickly coupled to the main supply line 25. Thus, the assembly time and necessary time on the ground has been substantially reduced for an aircraft equipped with the present service columns forming housings for the service and comfort elements. Furthermore, the present service columns containing the service elements are not a structural component of the passenger seat, whereby service work on the columns is entirely independent of any seat.

Advantages of the invention are particularly seen in that the seated passenger can easily and comfortably reach and operate the service functions without disturbing a neighbor. By eliminating the passenger service functions in the area below the luggage compartments, a more spacious impression of the passenger cabin is achieved, which has a positive effect on the comfort and sense of well-being of the passengers. Furthermore, in an arrangement in which the passenger service functions are allocated to respective seats, time- and work-consuming efforts to adapt the service units are not necessary when a seating layout is to be changed into another seating layout, thereby significantly increasing the layout flexibility.

Although the invention has been described with reference to specific example embodiments, it will be appreciated that it is intended to cover all modifications and equivalents within the scope of the appended claims.

What is claimed is:

1. A combination for an aircraft passenger cabin (C) including a cabin floor (F), said combination comprising passenger seats adapted to be arranged in a row on said cabin floor and a passenger service unit for each of said passenger seats, each said passenger service unit comprising a separate modular column housing, an armrest secured to said separate modular column housing and comfort and service elements selected from the group consisting of a reading lamp, flight attendant call button, loudspeaker, air nozzle, oxygen mask, oxygen generator, optical display and a keyboard, installed in at least one of said separate modular column housing and said armrest, said separate modular column housing having a configuration complementing any one of said passenger seats, said combination further comprising an armrest mounting centrally positioned on each modular column housing, said armrest mounting securing said armrest to its respective modular column housing, a main supply line (25) adapted for installation in said aircraft passenger cabin, said main supply line including power supply lines, information supply lines and air supply lines for said comfort and service elements, a feeder line (23) connecting said comfort and service elements to said main supply line, and a column mounting (12, 21) for securing said separate column housing to said cabin floor independently of said passenger seats arranged in a row, said feeder line (23) passing through said column mounting into a respective column housing.

2. The combination of claim 1, wherein said passenger seats comprise an elongated support frame (7) for said passenger seats arranged in a row and a cross-beam (22) forming part of said elongated support frame.

3. The combination of claim 2, wherein said cross-beam (22) forming part of said elongated support frame is a hollow cross-beam (22) for serving as a channel for said feeder line (23) for said comfort and service elements.

4. The combination of claim 2, wherein said modular column housing comprises a lower column section including an opening (11) for receiving said cross-beam (22) of said elongated support frame (7).

5. The combination of claim 1, wherein each modular column housing comprises an upper column portion above said armrest, said upper column portion having an upper end forming a head section (13).

6. The combination of claim 5, wherein said head section (13) is constructed and positioned as a sight shield to restrict a view area between two neighboring passenger seats.

7. The combination of claim 1, wherein said column mounting for each modular column housing comprises a column foot (12) adapted for mounting said modular column housing to said floor of said passenger cabin.

8. The combination of claim 1, wherein said modular column housing comprises a column portion facing rearwardly of a backrest of said passenger seats, and wherein at least one of said comfort and service elements (17) is housed in said rearwardly facing column portion for service to a passenger seat positioned behind said passenger seats arranged in a row.

9. The combination of claim 1, wherein said column mounting comprises a hollow floor plate (21) forming a cross-conduit adapted to be secured to said cabin floor, wherein each said modular column housing (8) has a lower end connected to said floor plate (21), and wherein said feeder line (23) passes through said cross-conduit, said feeder line including a flexible supply line adapter (24) connecting said feeder line (23) of said comfort and service elements in said separate modular column housing, to said main supply line (25).

10. The combination of claim 1, wherein said separate modular column housing comprises an elongated configuration with an upper column portion having a concave shape and a lower column portion having a convex shape, said concave shape and said convex shape facing in opposite directions.

11. The combination of claim 10, wherein said concave shape changes into said convex shape where said armrest mounting (18A) is centrally positioned in said modular column housing.

\* \* \* \* \*

UNITED STATES PATENT AND TRADEMARK OFFICE
CERTIFICATE OF CORRECTION

PATENT NO. : 5,984,415

DATED : Nov. 16, 1999

INVENTOR(S) : Markus Schumacher et al.

It is certified that error appears in the above-identified patent and that said Letters Patent is hereby corrected as shown below:

Col. 4, line 36, after "13." delete "This"; after "13." insert --A column foot 12 secures the column 8 to a floor plate 21. The--;

Col. 6, line 23, after "9" (second occurrence) delete "configuration";
line 24, after "column" insert --configuration--;

Col. 7, line 10, after "mask" (second occurrence) replace "16" by --16'--;

Signed and Sealed this

Third Day of April, 2001

Attest:

NICHOLAS P. GODICI

Attesting Officer

Acting Director of the United States Patent and Trademark Office